J. A. SWINEHART.
VEHICLE TIRE.
APPLICATION FILED JAN. 31, 1906.
902,926.
Patented Nov. 3, 1908.
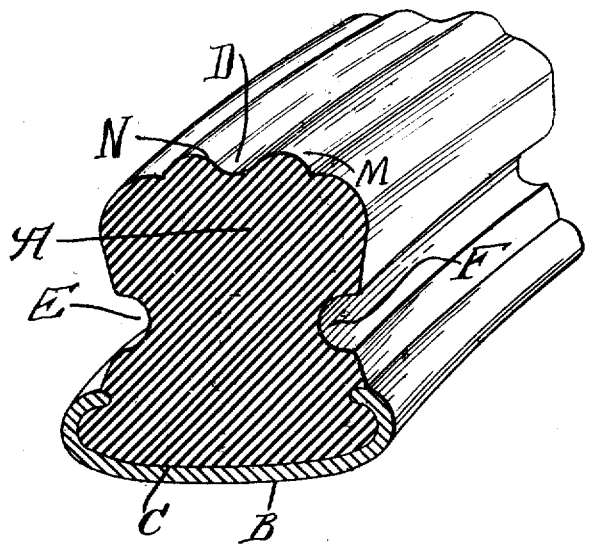
Witnesses:
C. C. Fur,
John O. Seifert.
Inventor:
James A. Swinehart,
By his Attorney,
F. H. Richards.

UNITED STATES PATENT OFFICE.

JAMES A. SWINEHART, OF AKRON, OHIO.

VEHICLE-TIRE.

No. 902,926.　　Specification of Letters Patent.　　Patented Nov. 3, 1908.

Application filed January 31, 1906. Serial No. 298,746.

*To all whom it may concern:*

Be it known that I, JAMES A. SWINEHART, a citizen of the United States, residing in Akron, in the county of Summit and State of Ohio, have invented certain new and useful Improvements in Vehicle-Tires, of which the following is a specification.

This invention has reference to improvements in vehicle tires formed of resilient material such as rubber, and which are substantially solid in cross section, depending for the resiliency upon the compression of the tire between the rim of the wheel and the ground.

The object of the invention is to produce a form of tire to effectually prevent skidding or sidewise movement of the wheel; and to further increase the resilient effect of the tire.

In the accompanying drawing, the figure represents in perspective a section of a tire embodying my invention, with a rim applied thereto.

The tire illustrated is denoted generally by A and at the base C thereof is shown a rim B to which the tire may be secured in any suitable manner; the construction of the base portion of the tire forming no part of the present invention.

On the tread portion of the tire is provided at the middle portion a groove D extending around the circumference of the tread. This groove is shown as concave or curved in section.

Ribs are provided on the circumference of the tread portion at each side of the groove D. In the present instance, the tread is provided with a rib M convex or cylindrical and arranged adjacent the groove D, the adjacent portions of the groove and rib merging into an ogee curve. On the other side of the groove D is provided a convex or cylindrical rib N. The adjacent portions of the rib N and groove D also merging by an ogee curve. These ribs M and N do not extend to the side edge of the tread portion. The side faces of the tire are reëntrant. In the form shown there is a concaved groove E formed on one side of the tire and a similar groove F formed on the other side of the tire. Such grooves permit a greater compression of the tire at the middle transverse portion, the tire at the opposite edges of these grooves approaching under compression.

In the use of such tire, the ribs on each side of the groove at the tread portion will engage the ground or pavement to effectually prevent the side motion of the wheel. And this arrangement in combination with the concave sides, will give a greater resiliency to the tire, and prevent skidding.

From the foregoing it will be seen that the present improved clencher rim tire comprises a solid elastic body made up of two sections integrally united by a solid neck portion, one comprising a tread section having greater area in cross section than said neck portion, thereby to form a relatively flat tread having the construction hereinbefore described, and the other section comprising a rim section separated from said tread section by a pair of circumferentially extending grooves, the mass between said grooves forming the neck portion integrally uniting the rim and the tread section and enabling the tread section to be compressible relatively to the rim section.

Having thus described my invention, I claim:

1. The herein described tire comprising a solid elastic body having its sides curved inwardly at the tread and terminating at the base of a pair of annular ribs, one adjacent to each outer side of the tread, said ribs forming a centrally located annular concaved groove, the groove and ribs being of substantially the same area in cross section whereby the height of the ribs and the depth of the groove are substantially the same.

2. The herein described tire comprising a solid elastic body consisting of a rim section and a tread section, having therebetween at each side an annular concaved recess, the sides of the tread section appreciably projecting beyond the inner walls of such concaved recesses whereby the resiliency of the tire is increased, the tread section having sides curved inwardly at the tread and terminating at the base of a pair of annular ribs, one adjacent to each side of the tread, said ribs forming a centrally located annular concaved groove, the groove and ribs being of substantially the same area in cross section whereby the height of the ribs and the depth of the groove are substantially the same.

JAMES A. SWINEHART.

Witnesses:
WILLIAM H. REID,
F. E. BOYCE.